UNITED STATES PATENT OFFICE.

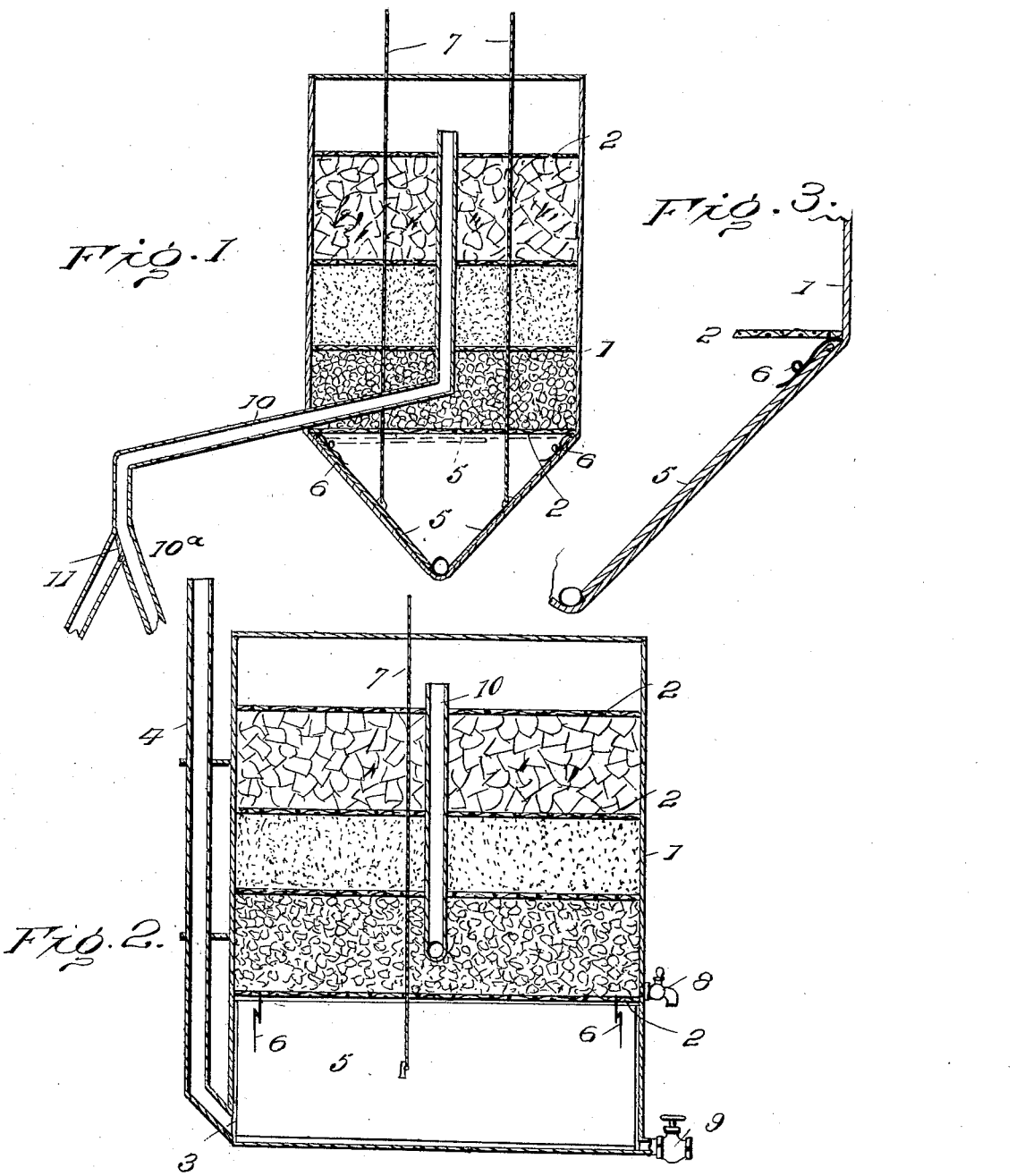

WENCESLAUS FRANK MIKOLASEK, OF VODNANY, SOUTH DAKOTA.

RAIN-WATER FILTER.

No. 838,129. Specification of Letters Patent. Patented Dec. 11, 1906.

Application filed April 7, 1906. Serial No. 310,569.

*To all whom it may concern:*

Be it known that I, WENCESLAUS FRANK MIKOLASEK, a citizen of the United States, residing at Vodnany, in the county of Bonhomme and State of South Dakota, have invented certain new and useful Improvements in Rain-Water Filters, of which the following is a specification.

My invention contemplates certain new and useful improvements in filtering devices, and is particularly applicable for use in filtering rain-water preparatory to its reception in cisterns or other storage-receptacles.

The object of my invention is to provide a filter of this character which will embody few and simple parts capable of being easily and cheaply constructed and embodying several superposed strata of filtering materials, through which the water will percolate in an upward direction, being finally discharged from the upper end of the filter-casing, the casing being provided with a hinged cut-off or plates so arranged that they may be swung up whenever desired against the screen supporting the lowermost stratum of a filtering medium to cut off the filter portion of the casing from the lower receiving portion thereof, so as to permit the lower end of the casing to be flushed whenever desired by shunting the water directly through the casing without going through the filtering media.

For a full description of the invention and the merits thereof, and also to acquire a knowledge of the details of construction of the means for effecting the result, reference is to be had to the following description and accompanying drawings, in which—

Figure 1 is a vertical section of my improved rain-water filter. Fig. 2 is a similar view, the section being taken at right angles to Fig. 1. Fig. 3 is a detail view, on an enlarged scale, of a portion of the casing and one of the cut-off plates.

Corresponding and like parts are referred to in the following description and indicated in all the views of the drawings by the same reference characters.

Referring to the drawings, the numeral 1 designates the casing of my improved filter, which may be constructed of tin or galvanized iron or any other desired light sheet metal. It is provided with a plurality of screens 2, arranged in superposed and spaced relation to each other within the casing and supporting different kinds of filtering materials, arranged in layers or strata, preferably the lowest consisting of gravel, the next above of sand, and the next above of charcoal.

The screens 2 may be supported within the casing 1 in any desired manner. The lower end of the casing 1 is preferably tapered in cross-section, as shown in the drawings, and is provided at one side of its lower tapered edge with a water-inlet 3, leading from the pipe 4, which may be the pipe leading from the roof of a building or the like, the casing 1 being preferably supported in any desired manner against the wall of the building.

5 designates two cut-off plates, which are hinged to the side walls of the casing 1, near the lower end thereof, and are normally pressed upon by a spring 6, so that they will lie flat against the stationary converging side walls of the casing, as illustrated in Fig. 3. Cables or the like 7 are secured to the respective plates 5 intermediate their ends and are arranged to draw the two plates 5 upwardly and to hold them up against the lowermost screens 2. The plates 5 are of such length that when thus drawn up they will overlap each other and effectually cut off the filtering portion of the filter-casing 1 from that portion thereof which is below the lowermost screen 2.

8 designates the draw-off cock for the filtering portion of the casing 1, located at one lower corner of said portion, and 9 designates a flushing-opening provided with any desired form of closure or valve.

10 designates the discharge-pipe, the receiving end of which is located within the casing just above the uppermost screen 2. The pipe 10 extends in an angular direction out of the casing 1 and is connected to the cistern or other storage-receptacle, (not shown) and, if desired, the pipe 10 may have a branch $10^a$, governed at its juncture with the main pipe 10 by a valve 11, so that the filtered water may be drawn away from the cistern, if desired, and be directed to any other desired point.

In the practical operation of my improved filter the rain-water coming in the pipe 4 will first enter the casing at the lower end thereof, and if the plates 5 are in their open or down positions and the flush-opening 9 closed the water will percolate up through the various screens 2 and through the filtering materials and after having been effectively filtered will enter the pipe 10 and through it to the cistern or other desired points. Whenever desired, the plates 5 may be drawn up into overlapped positions, cutting off the filtering-screens and their filtering material from the lower portion of the casing 1, and then by opening the flush-opening 9 the water entering from the pipe 4 will merely flush the lower portion of the casing 1 of the impurities that have been gathered therein during the filtering operation and will carry such impurities off through the flush-opening 9, the water being prevented by the plates 5 from entering the filtering portion of the filter. The draw-off cock 8 is provided, so that the water in the filtering portion of the casing 1 may be drawn off whenever desired. In the filtering operation it is of course to be understood that this cock 8 is closed.

Having thus described the invention, what is claimed as new is—

1. A filter comprising a casing, filtering means in said casing, means for admitting water to the lower end of the casing to permit it to percolate upwardly through the filtering means, the said casing being provided at its lower end with a flush-opening and a closure therefor, a discharge-pipe for the filtered water, and spring-pressed plates hinged to the casing near the lower end thereof, and means for drawing said plates upwardly against one side of the filtering means whereby to cut off the latter from the water-inlet.

2. A filter, comprising a casing, filtering means in said casing, two hinged plates, designed to overlap in the casing across one side of the filtering means whereby to cut off the same from the remainder of the casing, and means for admitting water into the last-named portion of the casing.

3. A filter, comprising a casing, a plurality of screens arranged in superposed and spaced relation in said casing, filtering media supported on said screens, the casing being provided with a water-admission opening below the lowermost screen and with a discharge-pipe with its receiving end above the uppermost screen, the casing being further provided with a flush-opening and a closure therefor, two hinged plates spring-pressed in said casing, and means for drawing said plates upwardly against the action of their springs, the said plates being designed to overlap against the lower side of the lowermost screen whereby to cut off the filtering devices from the lower end of the casing and from the water-admission opening and flush-opening.

In testimony whereof I affix my signature in presence of two witnesses.

WENCESLAUS FRANK MIKOLASEK. [L. S.]

Witnesses:
 E. A. BOUSKA,
 FRANK TILAR.